United States Patent Office 3,826,831
Patented July 30, 1974

3,826,831
FUNGICIDAL COMPOSITIONS AND METHODS OF COMBATING FUNGI USING OPTIONALLY HALOGENATED CYANOPHENYL O,S-DIALKYL PHOSPHOROTHIOLATES
Shigeo Kishino, Yasuo Yamada, Yoshio Kuramashi, and Toyohiko Kume, Tokyo, Japan, assignors to Bayer Aktiengesellschaft, Leverkusen, Germany
No Drawing. Original application Jan. 5, 1971, Ser. No. 104,177, now Patent No. 3,742,094, dated June 26, 1973. Divided and this application Feb. 6, 1973, Ser. No. 330,135
Claims priority, application Japan, Jan. 8, 1970, 45/2,286
Int. Cl. A01n 9/20, 9/36
U.S. Cl. 424—210
19 Claims

ABSTRACT OF THE DISCLOSURE

Optionally halogenated cyanophenyl O,S-dialkyl phosphorothiolates, i.e. cyanophenyl or halocyanophenyl O,S-dialkyl phosphorothiolates wherein one of the alkyl groups may be cycloalkyl, alkyl of 4–6 carbon atoms, a chlorine-substituted lower alkyl group or a phenyl group and the other alkyl group is methyl or ethyl, which thiolphosphates possess microbicidal, especially fungicidal properties.

---

This is a division of application Ser. No. 104,177 filed Jan. 5, 1971, now Pat. No. 3,742,094.

The present invention relates to and has for its objects the provision of particular new optionally halogenated cyanophenyl O,S-dialkyl phosphorothiolates, i.e. cyanophenyl or halocyanophenyl O,S-dialkyl phosphorothiolates wherein one of the alkyl groups may be cycloalkyl, alkyl of 4–6 carbon atoms, a chlorine-substituted lower alkyl group or a phenyl group and the other alkyl group is methyl or ethyl, which phosphorothiolates possess microbicidal, especially fungicidal properties, active compositions in the form of mixtures of such compounds with solid and liquid dispersble carrier vehicles, and methods for usng such compounds in a new way especially for combating microorganisms, especially fungi, with other and further objects becoming apparent from a study of the within specification and accompanying examples.

The specification of Japanese Patent Publication No. 16875/63 discloses that O,S-dialkyl-O-substituted phenyl-phosphorothiolates have insecticidal activity. However, there is nothing to lead one to expect that the compounds might have fungicidal properties or that they might be useful as fungicides and bactericides.

It has now surprisingly been found that the new S-alkyl-O-alkyl-O-cyanophenyl phosphorothiolates of the general formula

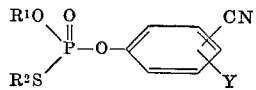

(I)

wherein

R¹ is an alkyl group with 4–6 carbon atoms, a cycloalkyl group, chlorine-substituted lower alkyl group or a phenyl group,
R² is an alkyl group with 1 or 2 carbon atoms, and
Y is hydrogen or halogen, exhibit excellent fungicidal activity.

The invention also provides a process for the production of a compound of the formula (I) in which a compound of the general formula

(II)

is reacted with a phenol derivative of the general formula

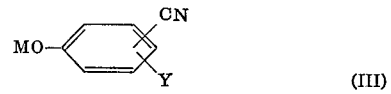

(III)

wherein $R^1$, $R^2$ and Y have the same meanings as in formula (I) and M is hydrogen, a metal or ammonium.

As is apparent from the general formula (I), the compounds of this invention have a structure characterized in that the groups $R^1$ and $R^2$ are asymmetric, and they exhibit excellent fungicidal activity, though their insecticidal activity is inferior as compared with analgous phosphate compound of the type disclosed in Japanese Patent Publication No. 16875/63.

The compounds of this invention exhibit high activity against pathogenic fungi causing diseases of plants and are excellent in that they are effective against fungi of a broad range. Further, these compounds have low toxicity to warm blooded animals and possess suitable affinity with higher plants, not being phytotoxic to higher plants at ordinary application concentrations. Accordingly, the compounds of this invention can be used suitably as agricultural and horticultural agents for preventing and controlling diseases of plants caused by fungi.

More specifically, the compounds of this invention can be used as fungicides for protecting plants from damage caused by *Archimycetes, Phycomycetes, Ascomycetes, Basidiomycetes, Fungi Imperfecti* and other fungi.

The active compounds of this invention can be applied for controlling pathogenic fungi living in the above ground portions of plants, pathogenic fungi invading plants from the soil and causing tracheomycosis, seed-borne pathogenic fungi and soil-infectious pathogenic fungi.

The above-mentioned excellent characteristics enable the active compounds of this invention to give good results when applied against diseases caused by those pathogenic fungi that have had to be controlled by fungicides containing heavy metals harmful to men and domestic animals, such as arsenic and mercury. Further, they give particularly good results in controlling pathogenic fungi and bacteria causing diseases of rice plants. More particularly, these compounds exhibit excellent activity against *Piricularia oryzea* causing blast on rice plants and *Pellicularia sasakii* causing sheath blight, and they may be used for controlling both these organisms simultaneously. The compounds exhibit curative activity as well as preventive activity.

Further, the compounds of this invention exhibit good controlling effects against fungi and bacteria which infect rice plants and other agricultural plants as *Xanthomonas oryzae* causing bacterial leaf blight on rice plants, *Ervinia aroideae* causing bacterial soft rot on chinese cabbage, *Xanthomonas citri* causing canker on citrus fruits, *Cochliobolus miyabeanus* causing brown spot on rice plants, *Mycosphaerella musicola* causing leaf spot on bananas, *Botrytis cinerea* causing gray mold on strawberry and other plants, *Plasmopara viticola* causing downy mildew on grapes, *Glomeralla cingulata* causing anthracnose on grapes, apples and pears, *Sclerotinia sclerotiorum* causing stem rot on vegetables, *Colletotrichum lagenarium* causing anthracnose on melons, *Diaporthe citric* causing melanose on citrus fruits, *Podosphaera leucotricha* causing powdery mildew on apples, *Sphaerotheca fuliginea* causing powdery mildew on cucumbers, *Alternaria mali* causing cork spot on apples, *Alternaria solani* causing early blight on potatoes, *Alternaria kikuchiana* causing black spot on pears, *Venturia inaequalis* causing scab on apples and *Venturia pirina* causing scab on pears.

As described above, the compounds of this invention exhibit excellent effects in the control of pathogenic fungi damaging rice plants and other cultivated plants. Accordingly, the compounds of this invention are very valuable in saving the labor needed to remove diseased plants to prevent their infection of healthy plants.

The phosphoric acid triesters of this invention are novel compounds which have now been synthesized for the first time. The preparation is illustrated by the following formula scheme:

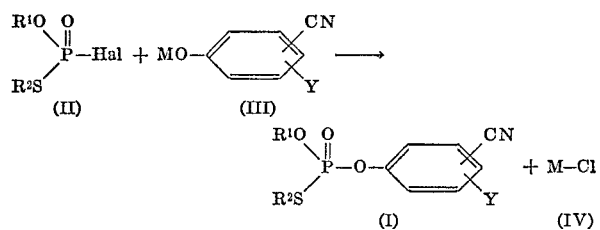

Examples of $R^1$ are n-, iso-, sec- or tert-butyl or pentyl or hexyl, cyclopentyl, cyclohexyl, chloromethyl, chloroethyl, 2,2,2-trichloroethyl, 1 - methyl - 2 - chloroethyl, 1-methyl-3-chloropropyl, 1-chloro-methyl-2-chloroethyl, 1-methyl-2-chloropropyl, 1-methyl-3-chloropropyl and phenyl, $R^1$ is preferably n-, iso- or sec-butyl, cyclohexyl, 2-chloroethyl, 1-methyl-2-chloroethyl, 1-chloromethyl-2-chloroethyl or phenyl.

Y is hydrogen atom or halogen such as fluorine, chlorine, bromine and iodine. Preferably, it is hydrogen, chlorine or bromine.

As examples of the phosphoric acid diester monohalides of formula (II), there may be mentioned O-n-(iso- or sec-) butyl-S-methyl-, O-n-(iso- or sec-) butyl-S-ethyl-, O-cyclohexyl-S-methyl (or ethyl)-, O-phenyl-S-methyl (or ethyl)-, O-(2-chloro)ethyl-S-methyl, O-(1-methyl-2-chloro)ethyl-S-methyl or ethyl)- and O-(1-chloromethyl-2-chloro)ethyl-S-methyl (or ethyl)-thiolphosphoryl chlorides.

As examples of the phenol of formula (III) there may be mentioned 2-(or)4- cyanophenol, 2-cyano-4-chlorophenol, 2-cyano-4-bromophenol and 2-chloro-4-cyanophenol, and salts of these phenols with ammonium or a metal such as sodium or potassium.

The reaction is preferably carried out in the presence of a solvent which term includes a mere diluent. Any inert solvent may be used for this purpose. Particularly good results are attainable with the use of aliphatic and aromatic hydrocarbons which may be chlorinated, such as methylene chloride, di-, tri- and tetra-chloroethylenes, chloroform, carbon tetrachloride, benzine, benzene, chlorobenzene, toluene and xylene; ethers such as diethyl- and di-n-butyl ethers, dioxane and tetrahydrofurane; low molecular weight aliphatic ketones and nitriles such as acetone, methylethylketone, methylisopropylketone, methylisobutylketone, acetonitrile and propionitrile; low boiling aliphatic alcohols such as methanol and isopropanol; and the like.

The reaction may be conducted in the presence of an acid binder. Compounds which are usually used as acid binder, for instance hydroxides, carbonates, bicarbonates and alcoholates of alkali metals and tertiary organic bases, such as triethylamine, dimethylaniline and pyridine, may be used.

When the reaction is effected in the absence of an acid binder, the intended product of high purity can be also obtained in high yield by forming a salt, preferably an ammonium or alkali metal salt, of the starting phenol in advance and then reacting the salt with the phosphoric acid diester monohalide.

The reaction of the invention may be performed over a broad temperature range. Generally, the reaction is carried out at temperatures ranging from about −20° C. to the boiling point of the reaction mixture. Preferably, the reaction is effected at about 0–100° C. It is preferable to conduct the reaction under atmospheric pressure but it is possible to carry out the reaction under reduced or elevated pressure.

The active compounds according to the instant invention can be utilized, if desired, in the form of the usual formulations or compositions with conventional inert (i.e. plant compatible or herbicidally inert) pesticide diluents or extenders, i.e., diluents or extenders of the type usable in conventional pesticidal formulations or compositions, e.g. conventional pesticide formulation or composition such as solutions, emulsions, suspensions, emulsifiable concentrates, spray powders, pastes, wettable powders, soluble powders, oil preparations, aerosol preparations, dusting agents, coated particles, tablets, granules, pellets, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, dimethylnaphthalene, aromatic naphthas, etc.), halogenated, especially chlorinated, aromatic hydrocarbons (e.g. chloro-benzenes, etc.), paraffins (e.g. petroleum fractions), chlorinated aliphatic hydrocarbons (e.g. methylene chloride, carbon tetrachloride, chloroethylene, etc.), cyclohexane, alcohols (e.g. methanol, ethanol, propanol, butanol, etc.), amines (e.g. ethanolamine, etc.), ethers, etheralcohols (e.g. glycol monoethyl ether, etc.), ketones (e.g. acetone, methylethylketone, cyclohexanone, etc.), strongly polar solvents such as acetonitrile, amides such as dimethyl formamide, sulfoxides (e.g. dimethyl sulfoxide, etc.); and/or water; as well as inert dispersible finely divided solid carriers, such as ground natural minerals (e.g. kaolins, attapulgite, clays, montmorillonite, chalk, i.e. calcium carbonate, talc, kieselguhr, etc.) and ground synthetic minerals (e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.; as well as gaseous diluents or carriers such as Freon and other aerosol propellants which are gaseous under normal conditions.

Such active compounds may be employed alone or in the form of mixtures with one another and/or with such solid and/or liquid dispersible carrier vehicles and/or with other known compatible active agents, especially plant protection agents, such as acaricides, insecticides, nematocides, rodenticides, plant growth-regulating agents, or fungicides (including antibiotic substances), herbicides, bactericides, etc., as well as fertilizers, if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–20%, preferably 0.01–5% by weight of the mixture. Thus, the present invention contemplates overall compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-lower volume process with good success, i.e., by applying such compound if normally a liquid, or by applying a liquid composition containing the same, via very effective atomizing equipment in finely divided form, e.g. average particle diameter of form 50–100 microns, or even less i.e. mist form, for example by airplane crop spraying techniques. Only up to at most about a few liters/hectare are needed, generally about 15 to 1000 g. per hectare, preferably about 40 to 600 g. per hectare, are sufficient. In this process it is possible to use highly concentrated liquid compositions with said liquid carier vehicles containing from about 20 to about 95% by weight of active compound or even the 100% active substance alone, e.g. about 20–100% by weight of the active compound.

In particular, the present invention contemplates methods of selectively killing, combating or controlling the pests, e.g. fungi, and more particularly, methods of killing or controlling fungi which comprises applying to at least one of correspondingly (a) such fungi, and (b) their habitat, i.e. the locus to be protected, a correspondingly combative or toxic amount, i.e. fungicidally effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, injecting, and the like.

It will be realized, of course, that the concentration of the particular active compound utilized in the admixture with the carrier vehicle will depend upon the intended application. Therefore, in special cases it is possible to go above or below the aforementioned concentration ranges.

The unexpected superiority and outstanding activity of the particular new compounds of the present invention is illustrated without limitation by the following examples.

EXAMPLE 1

11.9 g. of 2-cyanophenol and 10.2 g. of triethylamine were dissolved in 150 mL of benzene, and 11.7 g. of S-ethyl-O-n-butylthiolphosphoryl chloride were added dropwise to the solution at 10–20° C. with stirring. The stirring was continued for 2 hours at 25–30° C. and for another hour at 50–60° C. to complete the reaction. The reaction mixture was cooled, washed with water, 1% hydrochloric acid and 1% aqueous sodium carbonate and dried over anhydrous sodium sulfate. The benzene was removed by distillation and then the reaction mixture was subjected to distillation under reduced pressure to yield 22 g. of S-ethyl-O-n-butyl-O-(2-cyanophenyl) phosphorothiolate of the formula:

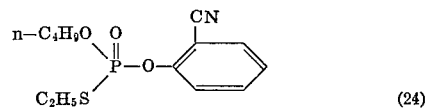

(24)

The product was characterized by boiling point of 162° C./0.3 mm. Hg and a refractive index $n_D^{20}$ of 1.5211.

This compound is listed in Table 1 along with others which can be prepared by analogous methods. In that table, the compounds are identified by the indication of the specific meanings of $R^1$, $R^2$ and Y and the position of the nitrile groups and of Y in formula (I).

TABLE 1

| Compound number | $R^1$ | $R^2$ | CN | Y | Physical properties | |
|---|---|---|---|---|---|---|
| | | | | | Boiling point | Refractive index |
| 1 | n-$C_4H_9$ | $CH_3$ | 2-CN | H | B.P. 148–150° C./0.1 mm. Hg | ($n_D^{20}$ 1.5258). |
| 2 | n-$C_4H_9$ | $CH_3$ | 2-CN | 4-Cl | B.P. 156° C./0.2 mm Hg | ($n_D^{20}$ 1.5358). |
| 3 | n-$C_4H_9$ | $CH_3$ | 4-CN | H | B.P. 166° C./0.25 mm. Hg | ($n_D^{20}$ 1.5290). |
| 4 | n-$C_4H_9$ | $CH_3$ | 4-CN | 2-Cl | B.P. 166–168° C./0.1 mm. Hg | ($n_D^{20}$ 1.5400). |
| 5 | iso-$C_4H_9$ | $CH_3$ | 2-CN | H | B.P. 155° C./0.1 mm Hg. | ($n_D^{20}$ 1.5254). |
| 6 | sec-$C_4H_9$ | $CH_3$ | 2-CN | H | | ($n_D^{20}$ 1.5271). |
| 7 | ⟨H⟩ | $CH_3$ | 2-CN | H | | ($n_D^{20}$ 1.5432). |
| 8 | Same as above | $CH_3$ | 2-CN | 4-Cl | | ($n_D^{20}$ 1.5520). |
| 9 | do | $CH_3$ | 4-CN | H | | ($n_D^{20}$ 1.5470). |
| 10 | do | $CH_3$ | 4-CN | 2-Cl | | ($n_D^{20}$ 1.5552). |
| 11 | $ClCH_2CH_2$ | $CH_3$ | 2-CN | H | | |
| 12 | $ClCH_2CH-$<br>$\mid$<br>$CH_3$ | $CH_3$ | 2-CN | H | B.P. 165° C./0.25 mm. Hg | ($n_D^{20}$ 1.5398). |
| 13 | $ClCH_2CH-$<br>$\mid$<br>$CH_3$ | $CH_3$ | 2-CN | 4-Cl | B.P. 171° C./0.1 mm. Hg | ($n_D^{20}$ 1.5520). |
| 14 | $ClCH_2CH-$<br>$\mid$<br>$CH_3$ | $CH_3$ | 4-CN | H | B.P. 173° C./0.15 mm. Hg | ($n_D^{20}$ 1.5463). |
| 15 | $ClCH_2CH-$<br>$\mid$<br>$CH_3$ | $CH_3$ | 4-CN | 2-Cl | | ($n_D^{20}$ 1.5591). |
| 16 | $ClCH_2CH_2CH-$<br>$\mid$<br>$CH_3$ | $CH_3$ | 2-CN | H | | |
| 17 | $ClCH_2CH_2CH-$<br>$\mid$<br>$CH_3$ | $CH_3$ | 2-CN | 4-Cl | | |
| 18 | $ClCH_2CH_2CH-$<br>$\mid$<br>$CH_3$ | $CH_3$ | 4-CN | H | | |

TABLE 1—Continued

| Compound number | R¹ | R² | CN | Y | Boiling point | Refractive index |
|---|---|---|---|---|---|---|
| 19 | $ClCH_2CH_2CH(CH_3)-$ | $CH_3$ | 4-CN | 2-Cl | | |
| 20 |  | $CH_3$ | 2-CN | H | B.P. 177–179° C./0.15 mm. Hg | ($n_D^{20}$ 1.5798). |
| 21 | Same as above | $CH_3$ | 2-CN | 4-Cl | B.P. 179–186° C./0.15 mm. Hg | ($n_D^{20}$ 1.5878). |
| 22 | do | $CH_3$ | 4-CN | H | B.P. 185°/C./0.03 mm. Hg | ($n_D^{20}$ 1.5832). |
| 23 | do | $CH_3$ | 4-CN | 2-Cl | | ($n_D^{20}$ 1.5922). |
| 24 | n-$C_4H_9$ | $C_2H_5$ | 2-CN | H | B.P. 162° C./0.3 mm. Hg | ($n_D^{20}$ 1.5211). |
| 25 | n-$C_4H_9$ | $C_2H_5$ | 2-CN | 4-Cl | B.P. 155–158° C./0.25 mm. Hg | ($n_D^{20}$ 1.5318). |
| 26 | n-$C_4H_9$ | $C_2H_5$ | 4-CN | H | B.P. 158–160° C./0.1 mm. Hg | ($n_D^{20}$ 1.5234). |
| 27 | n-$C_4H_9$ | $C_2H_5$ | 4-CN | 2-Cl | B.P. 164–165° C./0.15 mm. Hg | ($n_D^{20}$ 1.5345). |
| 28 | iso-$C_4H_9$ | $C_2H_5$ | 2-CN | H | B.P. 147° C./0.2 mm. Hg | ($n_D^{20}$ 1.5214). |
| 28 | iso-$C_4H_9$ | $C_2H_5$ | 2-CN | H | B.P. 147° C./0.2 mm. Hg | ($n_D^{20}$ 1.5214). |
| 29 | sec-$C_4H_9$ | $C_2H_5$ | 2-CN | H | | ($n_D^{20}$ 1.5241). |
| 30 | sec-$C_4H_9$ | $C_2H_5$ | 2-CN | 4-Cl | | ($n_D^{20}$ 1.5330). |
| 31 |  | $C_2H_5$ | 2-CN | H | | ($n_D^{20}$ 1.5390). |
| 32 | Same as above | $C_2H_5$ | 2-CN | 4-Cl | | ($n_D^{20}$ 1.5468). |
| 33 | do | $C_2H_5$ | 4-CN | H | | ($n_D^{20}$ 1.5430). |
| 34 | do | $C_2H_5$ | 4-CN | 2-Cl | | ($n_D^{20}$ 1.5506). |
| 35 | $ClCH_2CH(CH_3)-$ | $C_2H_5$ | 2-CN | H | B.P. 160–163° C./0.2 mm. Hg | ($n_D^{20}$ 1.5357). |
| 36 | $ClCH_2CH(CH_3)-$ | $C_2H_5$ | 2-CN | 4-Cl | B.P. 180° C./0.4 mm. Hg | ($n_D^{20}$ 1.5480). |
| 37 | $ClCH_2CH(CH_3)-$ | $C_2H_5$ | 4-CN | H | B.P. 178° C./0.3 mm. Hg | ($n_D^{20}$ 1.5407). |
| 38 | $ClCH_2CH(CH_3)-$ | $C_2H_5$ | 4-CN | 2-Cl | | ($n_D^{20}$ 1.5547). |
| 39 | $ClCH_2CH(CH_3)-$ | $C_2H_5$ | 2-CN | 4-Br | | ($n_D^{20}$ 1.5640). |
| 40 | $(ClCH_2)_2CH-$ | $C_2H_5$ | 2-CN | H | B.P. 175° C./0.05 mm. Hg | ($n_D^{20}$ 1.5490). |
| 41 | $(ClCH_2)_2CH-$ | $C_2H_5$ | 2-CN | 4-Cl | | ($n_D^{20}$ 1.5575). |
| 42 |  | $C_2H_5$ | 2-CN | H | B.P. 176° C./0.13 mm. Hg | ($n_D^{20}$ 1.5720). |
| 43 | Same as above | $C_2H_5$ | 2-CN | 4-Cl | B.P. 190° C./0.2 mm. Hg | ($n_D^{20}$ 1.5799). |
| 44 | do | $C_2H_5$ | 4-CN | H | B.P. 175° C./0.07 mm. Hg | ($n_D^{20}$ 1.5768). |
| 45 | do | $C_2H_5$ | 4-CN | 2-Cl | | ($n_D^{20}$ 1.5830). |

EXAMPLE 2

15 parts by weight of compound (17) of Table 1, 80 parts by weight of diatomaceous earth and 5 parts by weight of an emulsifier (i.e. polyoxyethylene alkylaryl ether) are mixed and crushed to prepare a wettable powder. This formulation may be diluted with water to the desired concentration and then be used as a ready-to-use-preparation.

EXAMPLE 3

30 parts by weight of compound (7) of Table 1, 30 parts by weight of xylene, 30 parts by weight of Kawakasol (an aromatic hydrocarbon with a boiling range of 150 to 200° C.) and 10 parts by weight of the emulsifier Sorpol (i.e. polyoxyethylenealkylaryl ether) are mixed and stirred to prepare an emulsifiable concentrate (an emulsifiable liquor). This formulation may be diluted with water to the desired concentration and then used as a ready-to-use-preparation.

EXAMPLE 4

To a mixture consisting of 10 parts by weight of compound (24) of Table 1, 10 parts by weight of bentonite, 78 parts by weight of a mixture of talc and clay (1:3) and 2 parts by weight of lignin sulfate, 25 parts by weight of water are added and the mixture is firmly kneaded. It is finely cut into granules of 0.5 to 1.5 mm. diameter by means of a granulating machine. The granules are then dried at a temperature between 40 to 50° C. to obtain a granular formulation. This formulation may directly be applied to the soil.

EXAMPLE 5

2 parts by weight of compound (27) of Table 1 and 98 parts by weight of a mixture of talc and clay (1:3) are mixed and crushed to prepare a dust. This formulation may directly be used as a ready-to-use-preparation.

EXAMPLE 6

Test on Blast of Rice Plants (*Piricularia oryzae*)

Preparation of sample chemical liquor

Solvent: 1 part by weight of acetone
Dispersing agent: 0.05 part by weight of sodium oleate
Other additive: 0.2 part by weight of gelatin
Water: 98.75 parts by weight A concentrated emulsifiable liquor (obtained by adding the active compound in an amount sufficient to obtain the prescribed concentration to the above amount of the solvent) was admixed with the above amount of water containing the above amounts of the dispersing agent and gelatin.

Test procedures (a) Test of preventive effect and the durability of effect (residual effect): Rice plant (jukkoku variety) was cultivated in a pot of 12 cm. diameter and the above-mentioned diluted liquor containing the active compound of this invention at the prescribed concentration was applied to the rice plant in the amount of 50 ml. per 4 pots.

One half of the chemical-sprayed rice plant was kept in a chamber maintained at 25° C. and a relative humidity of 100% for 2 days from the next day after the chemical spraying and the remaining half was kept in the same chamber for 2 days from the fourth day after the chemical spraying. While in the chamber, the rice plant was twice inoculated by spraying with a suspension of spores of artificially cultured pathogenic fungi of blast. From the results of the infection made the next day after the chemical spraying, the direct preventive effect can be evaluated, and from the results of the infection made the fourth day after the chemical spraying, the durability of the preventive effect (residual effect) can be ascertained.

Seven days after inoculation, the degree of infestation was determined by applying a scale ranging from 0 to 5, and the protective value of each particular active compound against *Piricularia oryzae* was determined in accordance with the formula below.

At the same time, the phytotoxicity against rice plants was determined.

| Degree of infestation: | Infested area of leaf in percent of total leaf |
|---|---|
| 0 | 0 |
| 0.5 | 0–2 |
| 1 | 2–5 |
| 2 | 5–10 |
| 3 | 10–20 |
| 4 | 20–40 |
| 5 | 40 or more |

Protective value =

$$100 - \frac{\text{Degree of infestation of treated plants}}{\text{Degree of infestation of non-treated plants}} \times 100$$

The active compounds tested and the average results obtained can be seen from the following Table:

TABLE 2

[Results of tests on effects against blast of rice plant]

| Compound number | Active component concentration (p.p.m.) | Preventive effect | Residual effect | Phytotoxicity |
|---|---|---|---|---|
| 1 | 250 | 100 | 75 | — |
|   | 500 | 100 | 86 |   |
| 2 | 250 | 100 | 82 | — |
|   | 500 | 100 | 90 |   |
| 4 | 250 | 90 | 54 | — |
|   | 500 | 100 | 62 |   |
| 5 | 250 | 100 | 65 | — |
|   | 500 | 100 | 88 |   |
| 6 | 250 | 82 |  | — |
|   | 500 | 96 |  |   |
| 7 | 250 | 100 | 85 | — |
|   | 500 | 100 | 100 |   |
| 8 | 250 | 100 | 78 | — |
|   | 500 | 100 | 95 |   |
| 9 | 250 | 98 | 58 | — |
|   | 500 | 100 | 80 |   |
| 10 | 250 | 86 |  | — |
|   | 500 | 95 |  |   |
| 11 | 250 | 74 |  | — |
|   | 500 | 85 |  |   |
| 12 | 250 | 100 | 86 | — |
|   | 500 | 100 | 92 |   |
| 11 | 250 | 100 | 86 | — |
|   | 500 | 100 | 94 |   |
| 14 | 250 | 75 |  | — |
|   | 500 | 90 |  |   |
| 15 | 250 | 72 |  | — |
|   | 500 | 96 |  |   |
| 16 | 250 | 100 | 92 | — |
|   | 500 | 100 | 100 |   |
| 17 | 250 | 100 | 94 | — |
|   | 500 | 100 | 100 |   |
| 18 | 250 | 80 |  | — |
|   | 500 | 90 |  |   |
| 19 | 250 | 75 |  | — |
|   | 500 | 100 |  |   |
| 20 | 250 | 100 | 75 | — |
|   | 500 | 100 | 100 |   |
| 21 | 250 | 96 | 72 | — |
|   | 500 | 100 | 100 |   |
| 22 | 250 | 90 | 65 | — |
|   | 500 | 100 | 82 |   |
| 23 | 250 | 75 |  | — |
|   | 500 | 96 |  |   |
| 24 | 250 | 100 | 80 | — |
|   | 500 | 100 | 88 |   |
| 25 | 250 | 100 | 75 | — |
|   | 500 | 100 | 92 |   |
| 26 | 250 | 75 |  | — |
|   | 500 | 86 |  |   |
| 27 | 250 | 82 |  | — |
|   | 500 | 96 |  |   |

TABLE 2—Continued

| Compound number | Active component concentration (p.p.m.) | Preventive effect | Residual effect | Phytotoxicity |
|---|---|---|---|---|
| 28 | 250 | 100 | 74 | — |
|   | 500 | 100 | 100 |   |
| 29 | 250 | 100 | 68 | — |
|   | 500 | 100 | 96 |   |
| 30 | 250 | 92 | 72 | — |
|   | 500 | 100 | 84 |   |
| 31 | 250 | 100 | 96 | — |
|   | 500 | 100 | 100 |   |
| 32 | 250 | 100 | 78 | — |
|   | 500 | 100 | 95 |   |
| 33 | 250 | 92 | 74 | — |
|   | 500 | 100 | 86 |   |
| 34 | 250 | 88 | 75 | — |
|   | 500 | 98 | 84 |   |
| 35 | 250 | 100 | 76 | — |
|   | 500 | 100 | 100 |   |
| 36 | 250 | 94 | 68 | — |
|   | 500 | 100 | 100 |   |
| 37 | 250 | 76 |  | — |
|   | 500 | 88 |  |   |
| 38 | 250 | 75 |  | — |
|   | 500 | 92 |  |   |
| 39 | 250 | 82 |  | — |
|   | 500 | 94 |  |   |
| 40 | 250 | 100 | 78 | — |
|   | 500 | 100 | 100 |   |
| 41 | 250 | 96 | 82 | — |
|   | 500 | 100 | 100 |   |
| 42 | 250 | 100 | 85 | — |
|   | 500 | 100 | 100 |   |
| 43 | 250 | 100 | 82 | — |
|   | 500 | 100 | 96 |   |
| 44 | 250 | 82 |  | — |
|   | 500 | 96 |  |   |
| 45 | 250 | 76 |  | — |
|   | 500 | 100 |  |   |
| IBP (Comparison) | 480 | 86 | 22 | — |
| Untreated (Control) |  | 0 | 0 | — |

NOTE.—
(1) The compound numbers in the Table correspond to those in Table 1.
(2) Comparison is commercially available. O,O-diisopropyl-S-benzylphosphorothiolate.
(3) The symbol "—" in column "Phytotoxicity" means that the chemical did not adversely affect the growth of the rice plant.

EXAMPLE 7

Test of Effect Against Sheath Blight (*Pellicularia sasakii*)

Test procedures

Rice plant (Kinmaze variety) was cultivated in a 12 cm. diameter pot, and at the primary tillering stage the diluted liquor containing the active compound at the prescribed concentration, which was prepared in the same manner as in Example 6, was applied to the rice plant in an amount of 50 ml. per 3 pots.

The next day, the root of the sample rice plant was inoculated with pathogenic fungi of sheath blight which had been cultured in a barley culture medium for 10 days and in which sclerotia had been formed. Then the sample was kept in a chamber maintained at 28–30° C. and a relative humidity of more than 95% for 8 days. The degree of the disease was examined.

The degree of infestation was determined by means of the formula (1) and the protective value of each compound was calculated in accordance with the formula (2):

$$\text{Degree of infestation} = \frac{3 \cdot n_3 + 2 \cdot n_2 + 1 \cdot n_1 + 0 \cdot n_0}{3 \cdot N} \times 100 \quad (1)$$

wherein $N$ = the number of the total stems examined
$n_0$ = the number of non-infested stems
$n_1$ = the number of stems infested up to the first leaf (from the bottom)
$n_2$ = the number of stems infested up to the second leaf (from the bottom)
$n_3$ = the number of stems infested up to and above the third leaf (from the bottom)

Protective value =

$$100 - \frac{\text{Degree of infestation of treated plants}}{\text{Degree of infestation of non-treated plants}} \times 100 \quad (2)$$

TABLE 3
[Results of tests on sheath blight]

| Compound number | Active compound concentration (p.p.m.) | Protective value |
| --- | --- | --- |
| 7 | 250 | 88 |
| 24 | 500 | 76 |
| 27 | 250 | 71 |
| Untreated (control) | | 0 |

EXAMPLE 8

Plant Pathogens Test (Agar Dilution Method)

The active compound was mixed in an agar culture medium of potato to form the desired concentration of active compound therein. After the medium was poured into Petri dishes of 9 cm. diameter and coagulated, the same were inoculated with the corresponding plant pathogens. A control Petri dish to which no active compound was added, was also set up. After having been cultured at a temperature of 27° C. for 4 days, the growth condition of the plant pathogens was investigated and the degree of illfungal growth was determined by applying a scale ranging from 0 to 5 as follows:

The active compounds tested and the average results obtained can be seen from the following Table:

Degree of illfungal growth

0: no growth
1: 20% of the non-treated mycerial area
2: 40% of the non-treated mycerial area
3: 60% of the non-treated mycerial area
4: 80% of the non-treated mycerial area
5: the same growth as the non-treated area

What is claimed is:

1. A method of combating fungi which comprises applying to the fungi or a habitat thereof a fungically effective amount of an organic phosphoric ester of the formula

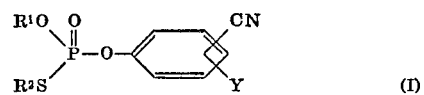

(I)

wherein
$R^1$ is an alkyl group with 4–6 carbon atoms, a cycloalkyl group, chlorine-substituted lower alkyl group or a phenyl group,
$R^2$ is an alkyl group with 1 or 2 carbon atoms, and
Y is hydrogen or halogen,
Y and —CN being present in the 2- and 4-positions.

2. The method according to claim 1 in which $R^1$ is n-, iso- or sec-butyl, cyclohexyl, 2-chloroethyl, 1-methyl-2-chloroethyl, 1-methyl-3-chloropropyl, 1-chloromethyl-2-chloroethyl or phenyl, and Y is hydrogen, chlorine or bromine.

3. The method according to claim 1 wherein such compound is S-methyl-O-n-butyl-O-(2-cyanophenyl) phosphorothiolate of the formula

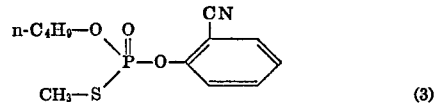

(3)

4. The method according to claim 1 wherein such compound is S-methyl-O-cyclohexyl-O-(2-cyanophenyl) phosphorothiolate of the formula

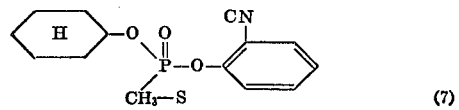

(7)

TABLE 4
[Effects against various pathogenic microorganisms of plants]

| Compound number | Concentration of active ingredient, p.p.m. | Piricularia oryzae (rice) | Pellicularia sasakii (rice) | Xanthomonas oryzae (rice) | Sclerotinia sclerotiorum (vegetables) | Colletotrichum lagenarium (melon) | Alternaria kikuchiana (pear) | Diaporthe citri (citrus) | Glomerella cingulata (grape) | Sclerotinia cinerea (peach) |
| --- | --- | --- | --- | --- | --- | --- | --- | --- | --- | --- |
| 3 | 800 | 0 | 0 | 0 | 0 | 0 | 0.5 | 0 | 0 | 0 |
| | 200 | 0 | 0 | 0 | 0 | 0.5 | 1 | 0 | 0.5 | 0.5 |
| | 50 | 0 | 0 | 0.5 | 2 | 1.5 | 1 | 1 | 2 | 1 |
| | 12.5 | 0 | 0.5 | 1 | 3 | 3 | 2 | 2 | 4 | 3 |
| 7 | 800 | 0 | 0 | 0 | 0 | 0 | 0 | 0 | 0 | 0 |
| | 200 | 0 | 0 | 1 | 0 | 0.5 | 0 | 0 | 0.5 | 0.5 |
| | 50 | 0 | 0.5 | 1.5 | 0.5 | 1 | 1 | 1 | 1 | 2 |
| | 12.5 | 0 | 1 | 2 | 1.5 | 2 | 2 | 2 | 2 | 3 |
| 12 | 800 | 0 | 0 | 0 | 0 | 0 | 0 | 0 | 0 | 0 |
| | 200 | 0 | 0 | 0 | 1 | 0.5 | 0.5 | 0.5 | 1 | 1 |
| | 50 | 0 | 0.5 | 1.5 | 2 | 2.5 | 1 | 1 | 2 | 2 |
| | 12.5 | 0 | 2 | 2 | 3 | 3 | 2 | 2 | 3 | 3 |
| 27 | 800 | 0 | 0 | 0 | 0 | 0 | 0 | 0 | 0 | 0 |
| | 200 | 0 | 0 | 0 | 0 | 0 | 0 | 0 | 0 | 0.5 |
| | 50 | 0 | 0 | 0 | 0.5 | 1 | 1 | 0.5 | 1 | 1 |
| | 12.5 | 0 | 0.5 | 0.5 | 2 | 3 | 1.5 | 1 | 2 | 3 |
| Untreated (control) | | 5 | 5 | 5 | 5 | 5 | 5 | 5 | 5 | 5 |

It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with warm-blooded creatures and plants for more effective control and/or elimination of fungi by application of such compounds to such fungi and/or their habitat.

It will be appreciated that the instant specification and examples are set forth by way of illustration and not limitation, and various modifications and changes may be made without departing from the spirit and scope of the present invention.

5. The method according to claim 1 wherein such compound is S-methyl-O-cyclohexyl-O-(2-cyano-4-chlorophenyl) phosphorothiolate of the formula

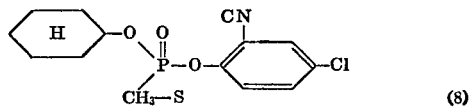

(8)

6. The method according to claim 1 wherein such compound is S-methyl-O-(1-methyl - 2 - chloroethyl)-O-(2-cyanophenyl) phosphorothiolate of the formula

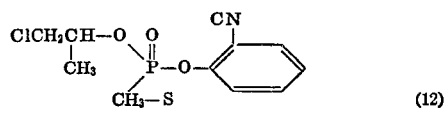

(12)

7. The method according to claim 1 wherein such compound is S-methyl-O-(1-methyl-2-chloroethyl)-O-(2-cyano-4-chlorophenyl) phosphorothiolate of the formula

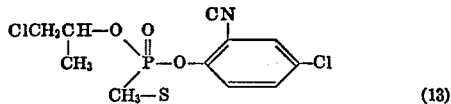
(13)

8. The method according to claim 1 wherein such compound is S-methyl-O-(1-methyl-3-chloropropyl)-O-(2-cyanophenyl) phosphorothiolate of the formula

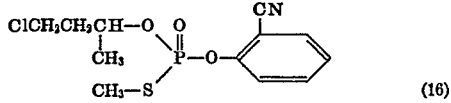
(16)

9. The method according to claim 1 wherein such compound is S-methyl-O-(1-methyl-3-chloropropyl)-O-(2-cyano-4-chlorophenyl) phosphorothiolate of the formula

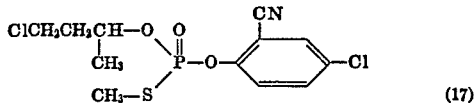
(17)

10. The method according to claim 1 wherein such compound is S-methyl-O-phenyl-O-(2-cyanophenyl) phosphorothiolate of the formula

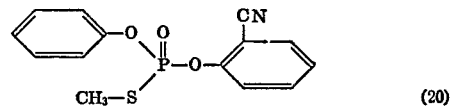
(20)

11. The method according to claim 1 wherein such compound is S-ethyl-O-n-butyl-O-(2-cyanophenyl) phosphorothiolate of the formula

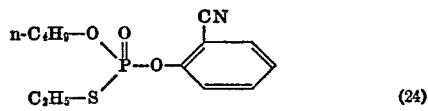
(24)

12. The method according to claim 1 wherein such compound is S-ethyl-O-n-butyl-O-(2-chloro-4-cyanophenyl) phosphorothiolate of the formula

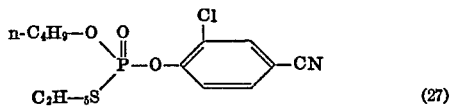
(27)

13. The method according to claim 1 wherein such compound is S-ethyl-O-iso-butyl-O-(2-cyanophenyl) phosphorothiolate of the formula

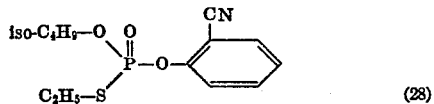
(28)

14. The emthod according to claim 1 wherein such compound is S-ethyl-O-sec.-butyl-O-(2-cyanophenyl) phosphorothiolate of the formula

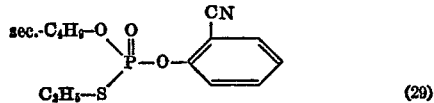
(29)

15. The method according to claim 1 wherein such compound is S-ethyl - O - cyclohexyl-O-(2-cyanophenyl) phosphorothiolate of the formula

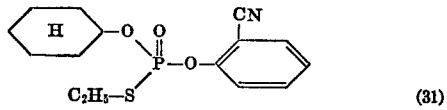
(31)

16. The method according to claim 1 wherein such compound is S-ethyl-O-(1-methyl-2-chloroethyl)-O-(2-cyano-4-bromophenyl) phosphorothiolate of the formula

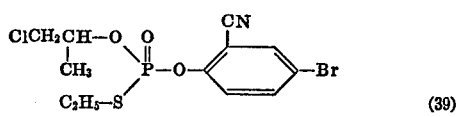
(39)

17. The method according to claim 1 wherein such compound is S-methyl - O - (1-cloromethyl-2-chloroethyl)-O-(2-cyano-4-chlorophenyl) phosphorothiolate of the formula

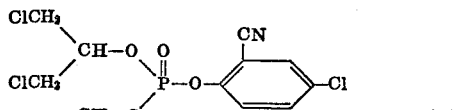
(41)

18. The method according to claim 1 wherein such compound is S-methyl-O-phenyl-O-(2-cyanophenyl) phosphorothiolate of the formula

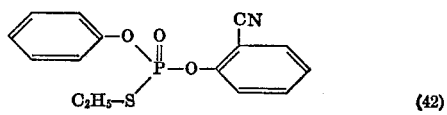
(42)

19. A fungicidal composition comprising a fungicidally effective amount of an organic phosphoric acid ester of the formula

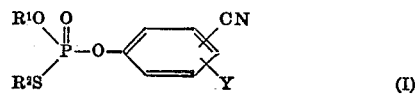
(I)

wherein $R^1$ is an alkyl group with 4–6 carbon atoms, a cylcloalkyl group, chlorine-substituted lower alkyl group or a phenyl group, $R^2$ is an alkyl group with 1 or 2 carbon atoms, and Y is hydrogen or halogen, Y and —CN being present in the 2- and 4-positions.

in admixture with an inert diluent.

References Cited

UNITED STATES PATENTS 3,309,371   3/1967   Curry et al. _____ 250—940

ALBERT T. MEYERS, Primary Examiner

A. J. ROBINSON, Assistant Examiner

UNITED STATES PATENT OFFICE
CERTIFICATE OF CORRECTION

Patent No. 3,826,831　　　Dated July 30, 1974

Inventor(s) SHIGEO KISHINO ET AL

It is certified that error appears in the above-identified patent and that said Letters Patent are hereby corrected as shown below:

Col. 1, line 7, correct spelling of inventor "Kurahashi".

Col. 2, line 4, correct Compound (II) to read as follows:

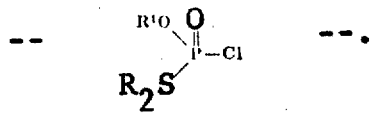

Col. 5, line 18, cancel "lower" and substitute -- low- --.

Cols. 7 and 8, - Table 1, cancel "Compound 28.......($n_D^{20}$ 1.5212). second occurrence.

Col. 13, claim 12, correct the formula for Compound (27) to read as follows:

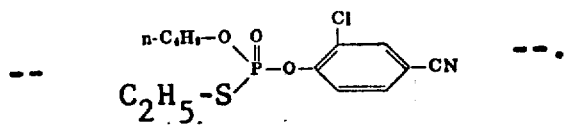

Col. 13, claim 14, line 1, correct spelling of "method".

Col. 14, Claim 18, line 2, change "methyl" to -- ethyl --.

Col. 14, Claim 19, line 2 after the formula, correct spelling of "cyclo".

Signed and sealed this 26th day of November 1974.

(SEAL)
Attest:

McCOY M. GIBSON JR.
Attesting Officer

C. MARSHALL DANN
Commissioner of Patents